United States Patent [19]
Santo

[11] Patent Number: 5,800,040
[45] Date of Patent: *Sep. 1, 1998

[54] INTERNAL REARVIEW MIRROR WITH COURTESY LIGHTS

[75] Inventor: Antonio Ferreira do Espirito Santo, Sao Paulo, Brazil

[73] Assignee: Metagal Insdustria e Comercio Ltda., San Paulo, Brazil

[ * ] Notice: The terminal 15 months of this patent has been disclaimed.

[21] Appl. No.: 236,369

[22] Filed: Apr. 29, 1994

[30] Foreign Application Priority Data

Jun. 25, 1993 [BR] Brazil ............................ 9302188

[51] Int. Cl.$^6$ .................................... B60Q 3/021
[52] U.S. Cl. ................. 362/83.1; 362/80.1; 362/83.3
[58] Field of Search .................... 362/74, 80.1, 83.1, 362/83.3, 140, 142, 294, 373, 331, 333; 315/84

[56] References Cited

U.S. PATENT DOCUMENTS

| | | | |
|---|---|---|---|
| 4,646,210 | 2/1987 | Skogler et al. | 362/142 |
| 4,733,336 | 3/1988 | Skogler et al. | 362/74 |
| 4,807,096 | 2/1989 | Skogler et al. | 362/142 |
| 5,178,448 | 1/1993 | Adams et al. | 362/83.1 |

*Primary Examiner*—Y My Quach
*Attorney, Agent, or Firm*—Michael J. Striker

[57] ABSTRACT

The internal rearview mirror with courtesy lights includes a mirror device (1) and an antiglare device (2) acting on the mirror device (1) in a housing (3); a courtesy light system (4) for the rearview mirror; an electronic control module (5) including a printed circuit board (70) and having a timing device (6) which controls a ceiling lamp (200), trunk lamp (202) and door courtesy lights (201); and a detachable support (7) including a spring loaded neck (8) and a base (9) mounted centrally to the ceiling or windshield. The printed circuit board (70) has holes (72) and the housing (3) has fixing columns (71) aligned with the holes (72) for mounting the printed circuit board securely in the housing with screws. The electronic control module (5) has an electrical connector (173) including a prismatic shaped support block (76) on a lateral extension (74) of the printed circuit board (70) and connector pins (73) arrayed on the lateral extension (74) and electrically connected to the electrical conductor paths (75). Both support block (76) and the lateral extension (74) are aligned with a not centrally positioned opening (37) of the housing (3), in which a claw (77) is provided which engages in a groove (77') in the lateral extension (74) so as to assist in holding the printed circuit board (70) in position.

16 Claims, 11 Drawing Sheets

INTERNAL REARVIEW MIRROR WITH COURTESY LIGHTS

BACKGROUND OF THE INVENTION

The present invention relates to an internal rearview mirror with courtesy lights, and, more particularly, to a rearview mirror of this type for a motor vehicle, which has a longer useful life and better performance than similar ones.

A presently known internal rearview mirror for a motor vehicle includes a mirror device mounted inside a housing, an antiglare device acting on the mirror device to minimize glare during operation, and a courtesy light system supplied by an electronic control module which includes a timing device which controls the ceiling lamp, the trunk lamp and courtesy lamps by the doors. The housing is connected pivotally to a detachable support formed by a spring releasable neck and a base which is attached to a ceiling area of the vehicle cabin, close to the center point of the upper side of the front windshield and/or directly on the windshield.

SUMMARY OF THE INVENTION

It is an object of the invention to provide an improved rearview mirror for a motor vehicle of the above-described type which does not have the disadvantages of the above-mentioned rearview mirrors of the prior art.

It is also an object of the invention to provide an improved rearview mirror for a motor vehicle of the above-described type, which has a better performance and longer life than those of the prior art.

These objects and others which will become more apparent hereinafter are attained in an internal rearview mirror with courtesy lights for a motor vehicle having a vehicle cabin with a ceiling and a front windshield, a trunk with a trunk lamp, doors with door courtesy lamps, and a ceiling lamp on the ceiling of the cabin. The internal rearview mirror includes a mirror device and an antiglare device connected to the mirror device, the mirror device and the antiglare device being mounted in a housing; a courtesy light system including on/off switches in the housing; an electronic control module including a printed circuit board with electrical conductor paths connected to the courtesy light system and having a timing device connected to and controlling the trunk lamp, the door courtesy lamps and the ceiling lamp; and a detachable support including a spring releasable neck and a base connected to the neck. The detachable support is pivotally connected to the housing and the base is attached centrally in the vehicle cabin directly to an upper portion of the front windshield or to a region of the vehicle cabin ceiling near to the upper portion of the front windshield.

According to the invention, the printed circuit board of the electronic control module has holes and the housing has fixing columns which are aligned with the holes of the printed circuit board so that the printed circuit board can be secured in the interior of the housing by fixing screws engaged in the fixing columns and passing through the holes; and the electronic control module has an electrical connector comprising a prismatic shaped support block on a lateral extension of the printed circuit board and a set of connector pins perpendicular to and arrayed directly on the lateral extension and passing through the support block, the connector pins being electrically connected to the electrical conductor paths. Both the support block and the lateral extension are aligned with a not centrally positioned opening of the housing, in which claw means is provided which engages in a groove in the lateral extension so as to assist in holding the printed circuit board in position; and interior conductor elements originating from the printed circuit board are provided for connection to the switches of the courtesy light systems.

The structure according to the invention prevents movement of the interior conductor elements which connect the electronic control module to the switches and to the support sockets for the lamps of the right and left light source devices and of the outside conductor elements, thus eliminating structural material fatigue, which may jeopardize performance of the rearview mirror.

In the rearview mirror according to the invention other improvements have been made including improvements in the antiglare mechanism; in the support, reflector and prismatization of the lenses of the courtesy lights, and in the recesses where the light sources of the courtesy lights are located. These improvements have as their purpose the improvement of structural details of the rearview mirror to provide, as a whole, a better performance and longer useful life of the rearview mirror.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
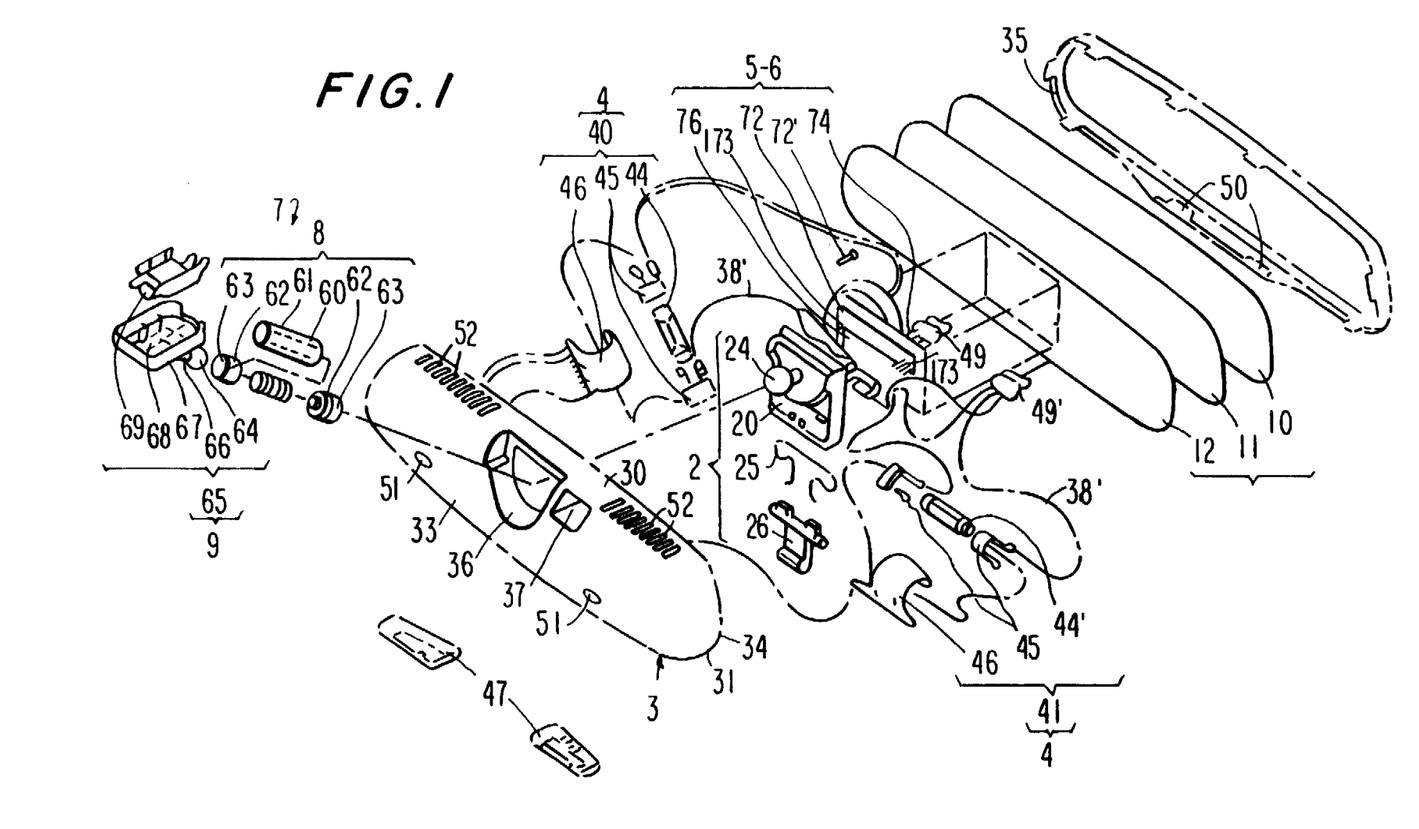
FIG. 1 is an exploded perspective view of a rearview mirror according to the invention.

As seen in the drawing, particularly FIG. 1, an embodiment of the internal rearview mirror comprises a mirror device 1, an antiglare device or mechanism 2 acting on the mirror device 1, a housing 3, which houses the mirrors and the antiglare device, a courtesy light system 4, an electronic control module 5 for supplying the courtesy light system 4 which includes a timing device 6 which controls a ceiling lamp 200, a trunk lamp 202 and door courtesy lamps 201 located near the doors and a support 7 for the housing 3. The housing 3 is pivotally connected to a support 7 comprising a spring releasable neck 8 and a base 9 connected to the neck 8. The base 9 is mounted on a region of the vehicle cabin ceiling near to the center point of the upper portion of the front windshield and/or directly on the windshield.

The mirror device 1 includes a prismatic glass 10, behind which there is an aluminized film 11 and, in back of that, a foam protector 12 to mask light from the courtesy light system 4.

Figures 13, 14:
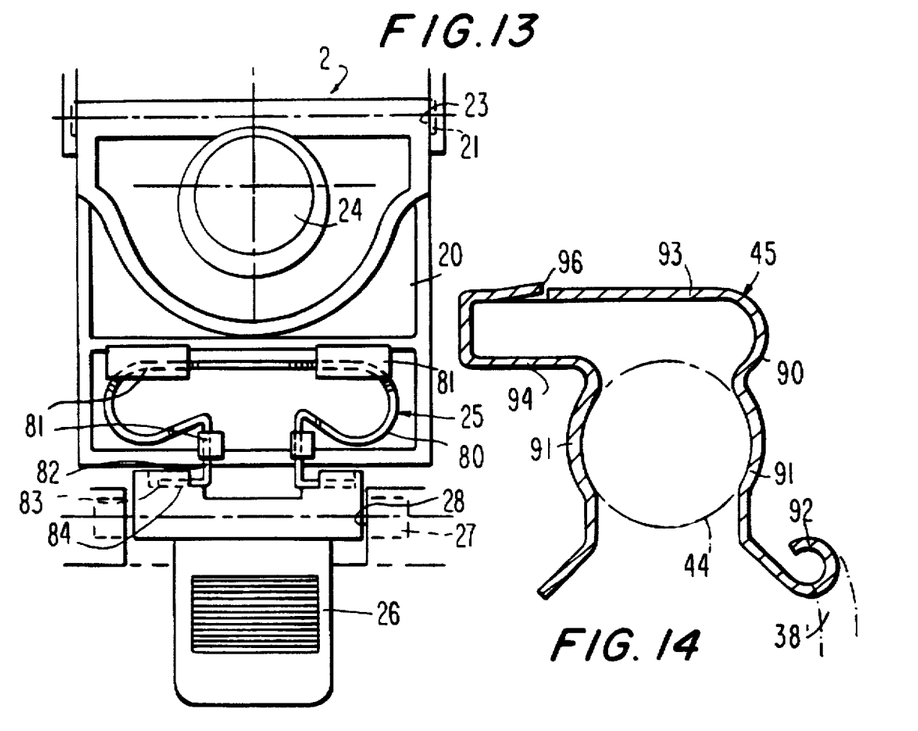
FIG. 13 is a detailed front plan view of the antiglare device.
FIG. 14 is a detailed cross-sectional view of an insulated lamp support of the rearview mirror of FIG. 1.

The antiglare device 2 is formed by a movable plate 20 which moves the mirror group 1. The plate 20 has upper corners provided with lateral shafts 21 which move on bearings 23 provided in the housing 3 (see FIGS. 2, 13 and 3). The middle region of the front face of the movable plate 20 is turned towards the mirror device 1, while its back side has a spherical element 24 mounted on it, where the corresponding end of the spring releasable neck 8 articulates, and the lower end of the plate 20 is biased by a spring 25 placed between the end of the plate 20 and the upper end of an operating lever 26. The operating lever 26 has shafts 27 at its upper corners and is supported via the shafts 27 by bearings 28 of the housing 3. A middle region of the lever protrudes from a lower window 29 of the housing 3, and the lower end of the lever projects from the lower window 29. The front and back housing edges of the lower window 29 bound the motion of the lever 26.

Figure 4:
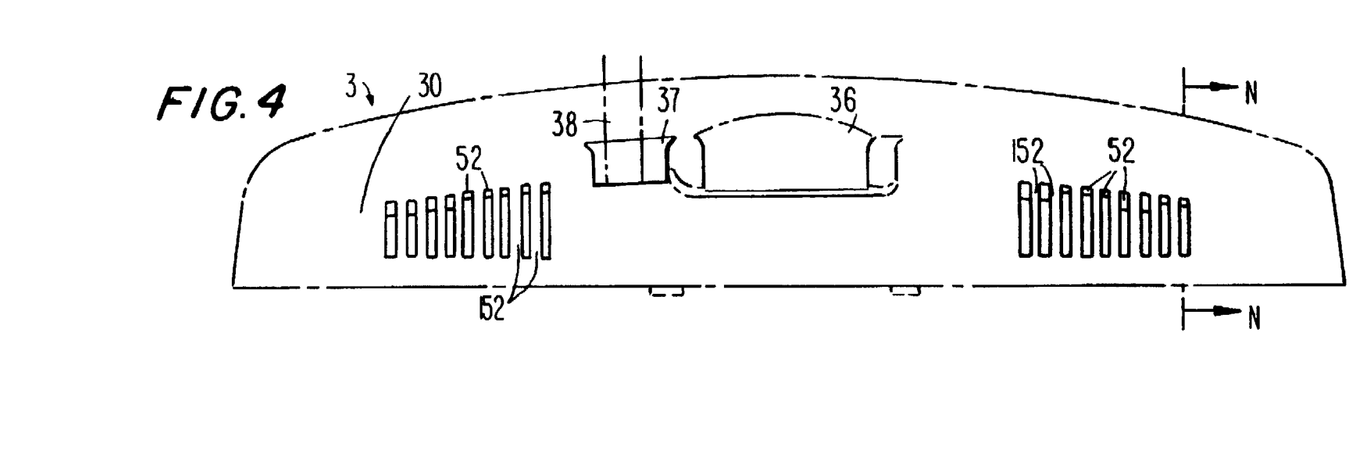
FIG. 4 is a diagrammatic top view of the housing.
Figure 5:
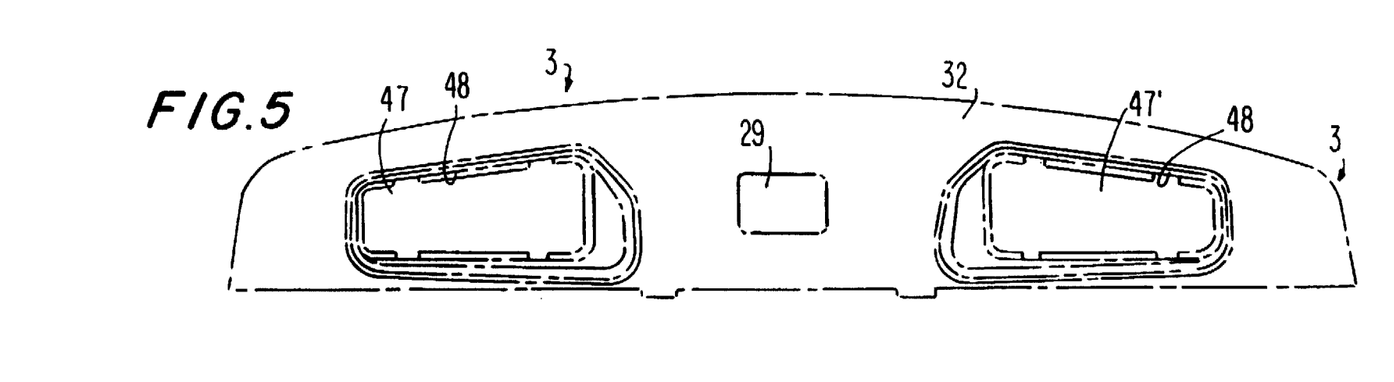
FIG. 5 is a diagrammatic bottom view of the housing.
Figure 6:
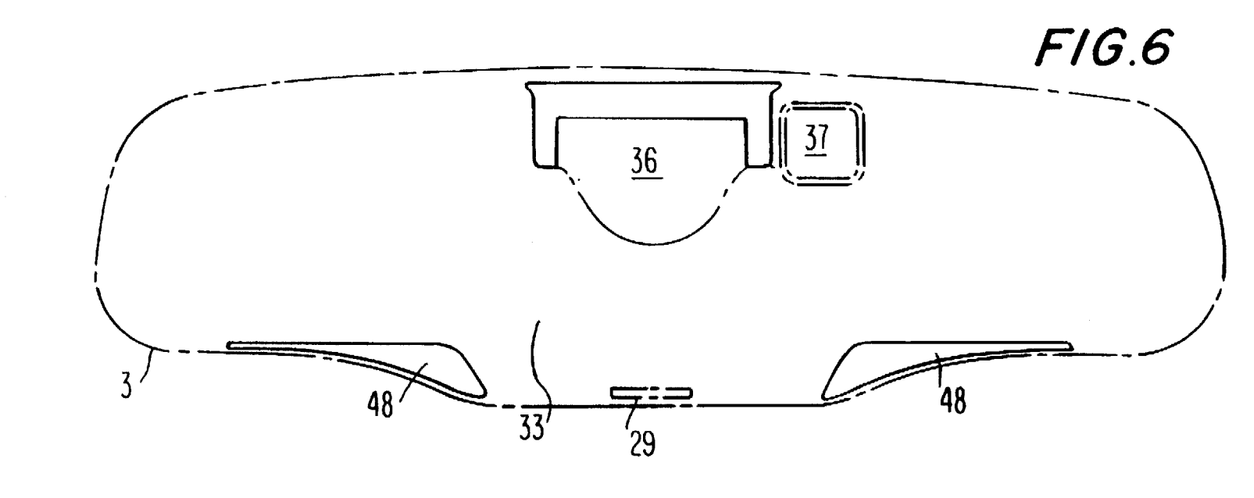
FIG. 6 is a diagrammatic rearview of the housing.

The housing 3 is shaped like a rectangular prism or is rectangular prismatic. It has an upper face 30, lateral faces 31, a lower face 32 and a back side 33 having edges in common with the upper, lower and lateral faces (see FIGS. 4, 5 and 6). The housing 3 also has a front mouth 34 through which the mirror device 1 is inserted and held by the frame 35 using claws. The back side 33 of the housing 3 also has a central opening 36 through which neck 8 of the support 7 passes and a not centrally positioned opening 37 for outside conductor elements 38 connected to the electronic control module 5 for supplying electrical power to the ceiling lamp 200, the door lamps 201 and trunk lamp 202.

Figure 2:
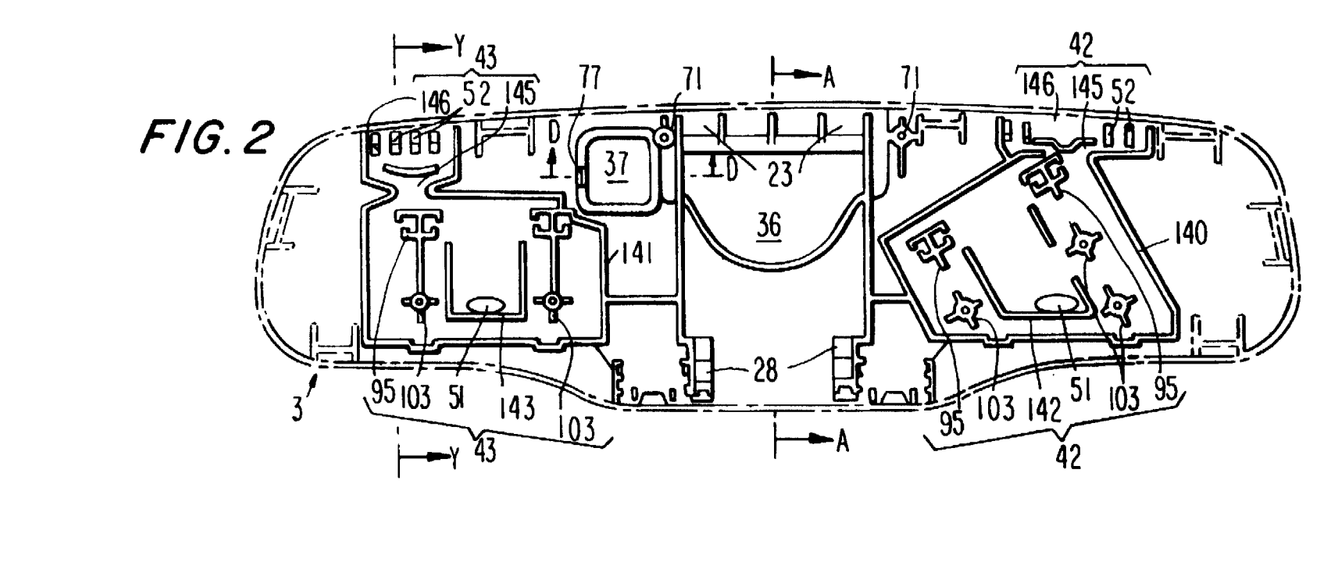
FIG. 2 is a front plan view of the housing of the mirror of FIG. 1, without various components of the mirror.
Figure 3:
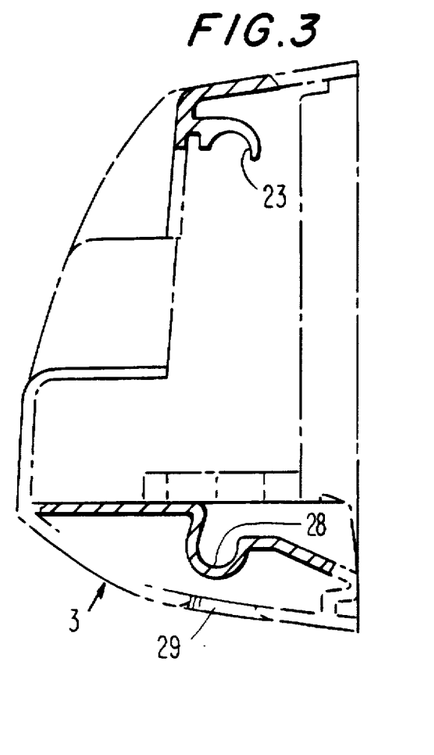
FIG. 3 is a detailed cross-sectional view, along the section A—A line of FIG. 2, taken along a transverse axis of the housing, showing, mainly, the assembling bearings of the antiglare device components.

The mirror courtesy light system 4 is formed by two mirror light source devices 40, 41, a right light source device 40 in a right side recess 42 of the housing 3 and a left light source device 41 of a left side recess of the housing 3 to avoid light leakage (See FIG. 2). Each light source device 40, 41 is formed by a cartridge-type lamp 44, 44', lamp support socket 45 reflector 46, lens 47 or 47' and on/off switches 49 installed in the respective openings 50 in frame 35. Each of the lenses 47 or 47' is mounted in opening 48 provided in the lower face 32 (FIG. 5) of the housing 3.

The right side recess 42 and the left side recess 43 (FIG. 2) of the housing 3 are provided with the respective ventilation devices for cooling of the right side light source device 40 and the left side light source device 41. These ventilation devices include the lower openings 51 provided for admission of cooling air and located in the back side 33 (FIG. 6) of the housing 3 correspondingly positioned in relation to the recesses 42 and 43 and upper parallel slots 52 for hot air outflow and provided in the upper face 30 (FIG. 4) of the housing 3.

The support 7 of the internal rearview mirror comprising the neck 8 and the base 9 is disconnectable, in other words, it may be detached from its normal position when it experiences an impact exceeding a predetermined amount, for example if it is hit by the body of a person who is in the vehicle, in case of accident and/or by the inflated air bag of the safety system. The neck 8 is formed by an external sleeve 60 which has a coil spring 61 in it, the ends of which are braced against the retaining bushings 62 which rest against and closes the ends of the sleeve 60. The bushings 62 are provided with longitudinal slots 63 and one of these bushings remains connected to the spherical element 24 protruding from the plate 20 of the antiglare device 2 and the other remains connected to a spherical element 64 of the base 9. This base 9 is formed by a plate 65, the lower face of which has a sloped projection 66 having, at its free end, the spherical element 64, and the upper face of which has peripheral rims 67 and a group of central members 68 for a leaf spring 69 which accommodates an element used to mount the rearview mirror on the vehicle ceiling or and/on the windshield.

Instead of the printed circuit of the electronic module being releasable and mounted on the movable plate 20 of the antiglare device 2, as it is in other rearview mirror devices, the printed circuit board 70 of the electronic control module 5 is fixed and mounted directly on the housing 3. The housing 3 is provided, for this purpose, with fixing columns 71 (FIG. 2), aligned with holes 72 of the printed circuit board 70. Receiving screws 72' engage in columns 71 and pass through the holes 72. This structure prevents movement of interior conductor elements 38' which connect the electronic control module 5 to the switches 49, 49' and to the support sockets 45 of the lamps 44, 44' and of the outside conductor elements 38, thus eliminating structural material fatigue, which may jeopardize performance of the rearview mirror.

Figure 8:
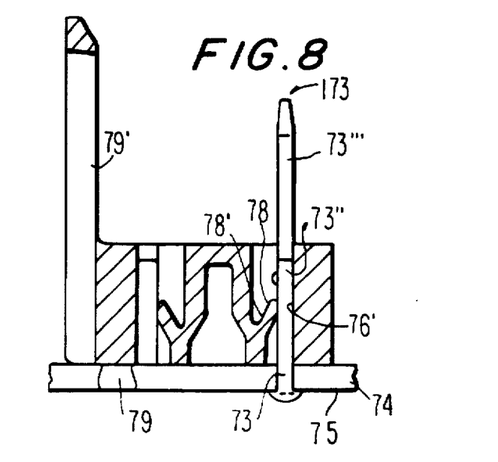
FIG. 8 is a cross-sectional view of the device shown in FIG. 7 taken along the section line C—C in FIG. 7.
Figure 9:
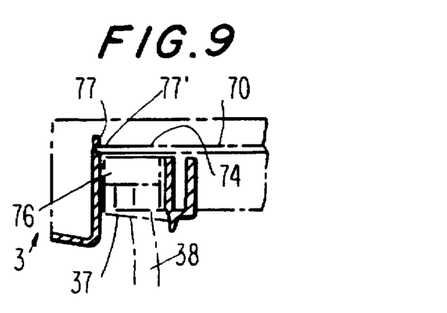
FIG. 9 is a detailed cross-sectional view taken along the section line D—D in FIG. 2 of a portion of the housing showing a back opening of the housing for passing of an outside conductor element for supplying the internal lamps and the ceiling, door courtesy and trunk lamps.
Figure 10:
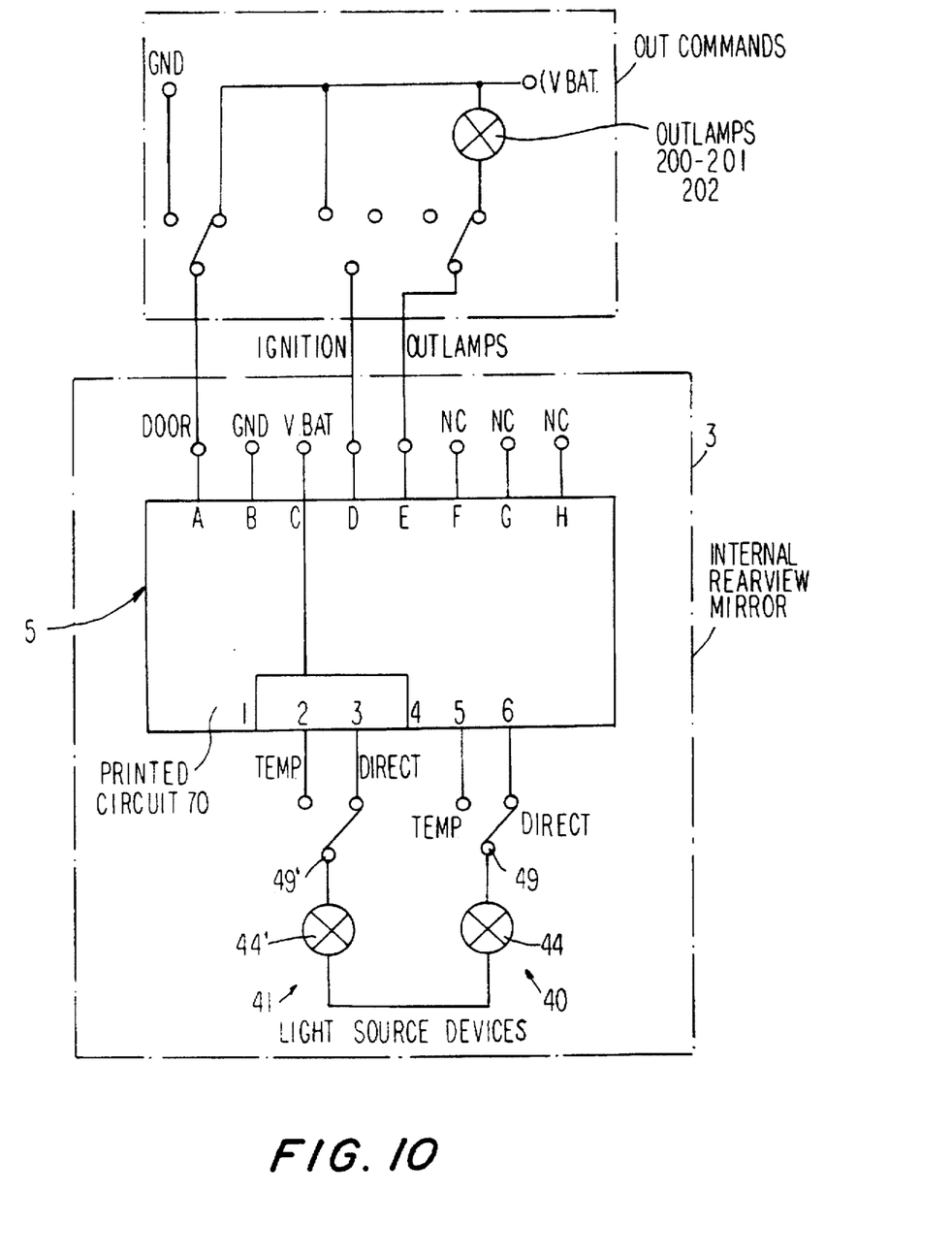
FIG. 10 is a schematic plan view of the mirror light source device, external lamp circuits and the electronic control module showing the outputs of the electronic control module and their connections.

Another improvement made in the electronic control module 5 is that, instead of having a conductor element from the printed circuit board 70 connected to a connector which, in turn, is connected to the outside conductor elements 38, the necessary connections for supplying electrical energy to the ceiling, trunk and door lights 200, 202, and 201 respectively are provided with a connector pin board 173 provided with connector pins 73 directed perpendicular to the printed circuit board 70 and as a lateral extension 74 of the printed circuit board 70. The connector pins 73 are connected to electrical conductor paths 75 on the printed circuit board 70 and the connector pins 73 pass through a prismatic shaped block 76 (see FIGS. 1, 7 and 8) which rests on the lateral extension 74. Both the support block 76 and the extension 74 are aligned with the not centrally positioned opening 37 of the housing 3. The housing 3 is provided with a claw 77 (FIG. 9) which engages the lateral extension 74 in a groove 77' provided in the lateral extension 74, which provides another point for the support of the printed circuit board 70. In this manner, coming from the printed circuit board 70, interior conductor elements 38' are provided for connection of the switches 49,49' and support sockets 45 of the lamps 44 of the right mirror light source device 40 and left mirror light source device 41. This structure extremely simplifies the electrical circuit which is part of the internal rearview mirror system, because it makes it easier to assemble the mirror, eliminating, also, the connecting elements between the printed circuit board and the outside conductor elements 38 for supplying electrical energy to the ceiling lamp 200, the door lamps 201 and the trunk lamp 202. The physical relationships between the electronic module 5, right and left mirror light source devices 40 and 41 and the trunk, ceiling and door courtesy lamps are seen in FIG. 10.

Each connector pin 73 has its contact end 73' (FIG. 7) passing through an electrical conducting sleeve in a throughgoing hole in the printed circuit board 70 and the contact end 73' is welded and connected to the corresponding electrical conducting path 75. The connector pin 73 has an expanded intermediate portion 73" remains within a throughhole 76' of the support block 76. Wedge-shaped claw element 78 of intermediate portion 73" The opposite end 73"' of the connector pin 73 remote from the connecting end 73' protrudes from the support block 76 and is connected to the outside conductor elements 38. The lower face of the support block 76 has at least one guiding and indexing projection 79 for connecting it with the printed circuit board 70, and a loop member 79' for connection to an outside conductor element 38 is provided, projecting above the upper face of the support block 76 and beyond the free ends of the connector pins 73.

Figure 7:
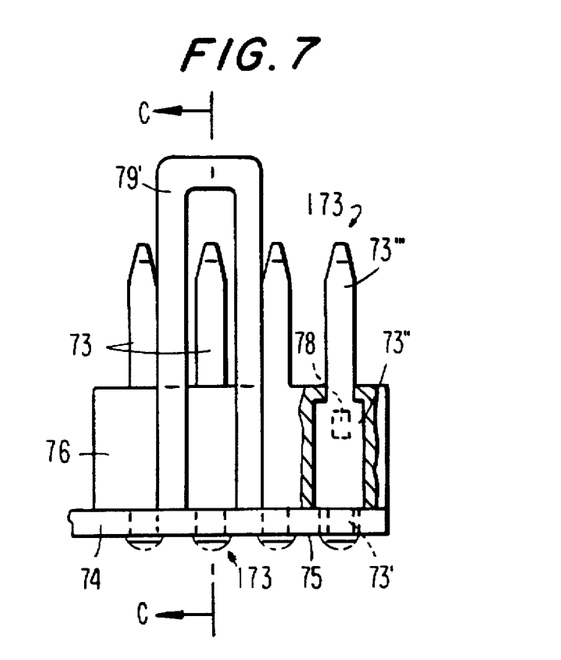
FIG. 7 is a partially cross-sectional, partially front plan view a connector incorporated in the electronic control module.

The support block 76, besides being a supporting element for the connector pins 73 and a retainer for connection of outside conductor elements 38, acts, also, as a stop element for the above-described connector for the outside conductor element 38 and, mainly in the first coupling of the support to the connector pins 73, when there may be a certain roughness in the abutting surfaces, which requires more force for the connection, and the support block/support 76 acts, further, as a distributor of coupling stresses on the printed circuit board 70 to relieve and not to force the connector pins 73.

The electronic control circuit module 5 for the right light source device 40 and the left light source device 41, ceiling light 200, door courtesy lights 201 and the trunk light 202 is formed, basically, by six different blocks or circuits (FIG. 11), namely: block (right output circuit means) 210 of outputs for the right light source device 40; block (left output circuit means) 211 of outputs for the left light source device 41; the power supply block or circuit means 212; the supply/protection block or circuit means 213; a timer block or circuit means 6; and a control block or circuit means 214, which generates and sends control signs to the timer circuit means 6.

Figure 11:
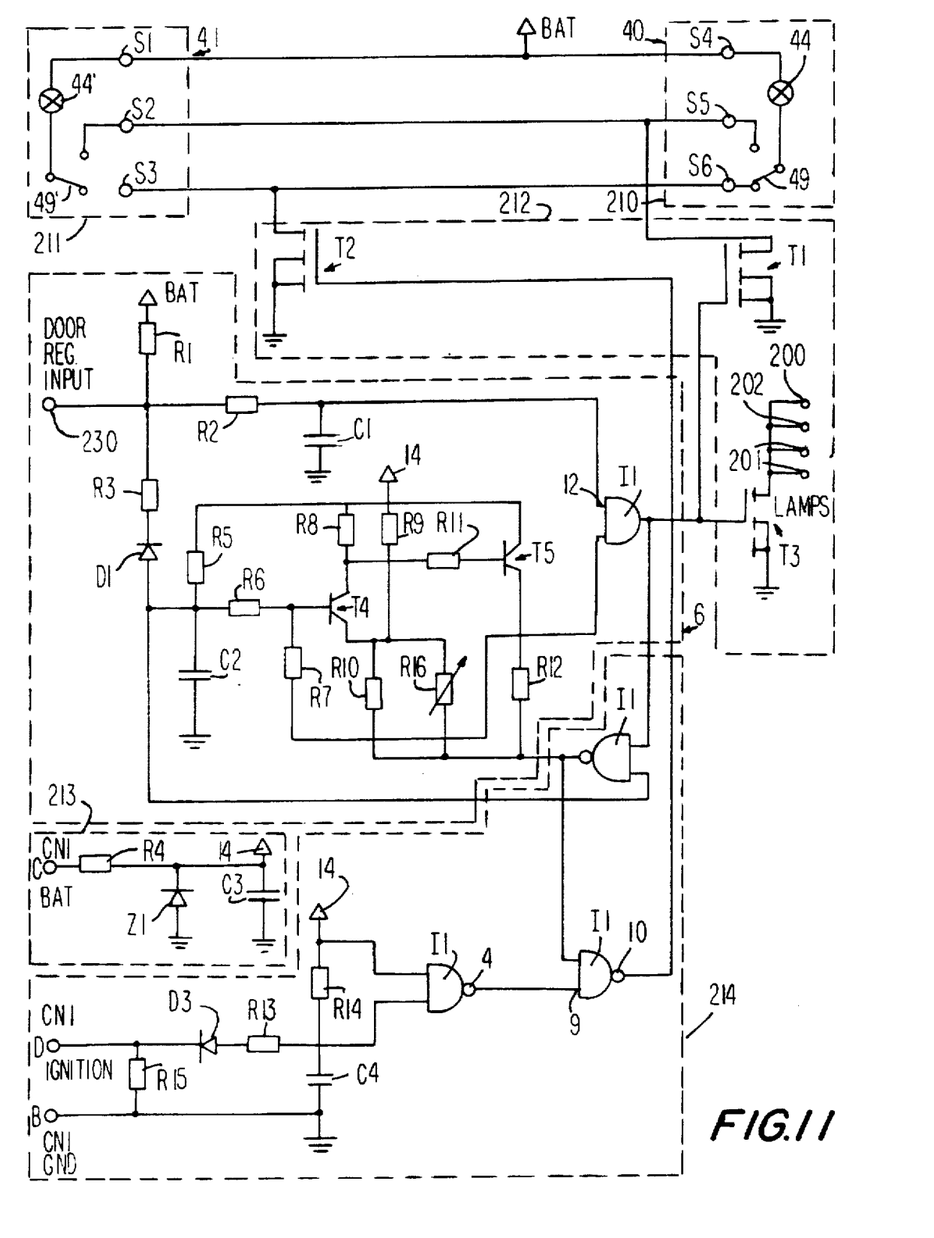
FIG. 11 is a circuit diagram of the electronic control module.

The output block 210 for the right light source device 40 includes the S4, S5 and S6 outputs, to which the corresponding light 44 and switch 49 are connected. The output block 211 for the left light source device 41 includes the S1, S2 and S3 outputs, to which the corresponding light 44' and switch 49' are connected. In the above-mentioned circuits 210 and 211 the interconnection of the S1, S2, S3 and S4, S5, S6 outputs and the respective switches 49, 49' switches and lights 44, 44' is achieved through the respective conductor elements 38,38', formed by four wires for each output, duly identified by different colors.

The power supply block 212 comprises three power-FETs T1, T2 and T3, and connects the (low power) control block 214 to the controlled one (high power light), through the power-FETs which control this electronic circuit, while avoiding sparking and providing a more reliable circuit operation and a longer circuit life.

The power supply/protection block 213 is composed basically by a resistor R4, a Zener diode Z1 which stabilizes the supply at a power supply voltage of 10 V, and the capacitor C3, which acts as a filter. These components are connected in such a way that they feed and protect the circuit against overloads which might destroy the integrated circuit, as well as against noise, which could appear during its activity, generated by motors and other sources within the vehicle and which might take the circuit to critical points.

The control block 214 consists essentially of the resistors R13 to R15, the diode D3, the integrated circuit I1 and the capacitor C4. These components are connected in such a way that this control block 214 acts in the circuit to indicate and send control signals to the timer block 6, so that it can switch the timer on or off. This is done through the ignition input CN1 D. A power FET is also controlled by this block. It is possible to achieve a manual selection of the switches 49, 49' of the right light source device 40 and left light source device 41.

The timer block 6 consists essentially of the resistors R1 to R3, R5 to R12 and R16, the diode D1, the capacitors C1 and C2, the transistors T4 and T5 and by the Integrated Circuit I1. These components are connected in such a way that, because of the block 6, it is possible to achieve the desired operation time (twenty seconds). The timer is activated by the keys 230 of the doors which control the door courtesy lights 201, depending on the state of block 214 which controls ignition, but, whenever the door switches 230 are activated (the doors swing opened), independently of the timer operation. This activates the two other power FETs, T3 and T1, switching the door courtesy lights 201 on and off.

The dotted resistors R1, R3, R6, R16, R4 and R13, shown in FIG. 11 are conventional components, while the remaining resistors are SMD 1206 components. The R16 resistor is to be used for the adjustment of the time during which the courtesy lights remain on. The C1 to C4 capacitors are +/−20% radial electrolytic capacitors. The D1 and D3 diodes are conventional signal diodes. The Z1 diode is a 5% conventional Zener diode. The T1 and T2 transistors are POWER-MOS transistors encapsulated in T0–226. The T3 transistor is a POWER-MOS transistor encapsulated in T0–220. The T4 and T5 transistors are SMD, SOT23 bipolar transistors. The integrated circuit constitutes four GATES, NAND, SOIC14.

The electronic module 5, with the above-described structure, operates as follows with reference to the pulse timing chart shown in FIG. 12:

The power supplied to the electronic circuit is stabilized at 10 V by the Z1 Zener diode and filtered by the C3 capacitor. Level 0=GND and Level 1=+V=10 V.

1st. stage: Manual operation of the right light source device 40 and the left light source device 41—outputs S5 and S2—by the switches 49 and 49' located at the rearview mirror.

In order to allow manual operation of the right light source device 40 and the left light source device 41, the ignition should be turned on, blocking the conduction of the D3 diode and starting the charging of the C4 capacitor through the R14 resistor.

After approximately 0.5 second of ignition time, the capacitor reaches the input saturation level (5.6) of the logic gate of the II integrated circuit taking, after such a period of time, the output 4 of the gate to level 0, with the input 9 of the NAND logic gate reaching level 0 and its output 10 passing to level 1. This level 1 is applied to the gate of Power-FET T2. Under this condition, the control of the right light source device 40 and the left light source device 41 may be performed by operating the switches 49, 49' to points (2,3) and (5,6) (see FIG. 12).

When one or both switches 49, 49' are operated, the voltage from the battery (V bat) is applied to the gate of T2 saturating it, applying GND to the light source device 40 or 41 corresponding to the respective operated switch 49, 49'. When the other terminals of the lights are always in V bat, the respective lights 40 or 41 are turned on. If, upon operating the ignition, one or both of the switches 49, 49' are in the ON position, the light will be on only after the period of time taken by C4 to reach the saturation level of the input 6 of the NAND logic gate, the value of which is 0.5 second.

2nd. Stage: controlled operation of the reading lights (outputs S5, S2). The timing of the courtesy lights is then only achieved when ignition is on. Upon turning the ignition off, the C4 capacitor is discharged through the R13 resistor, the D3 diode and R15 resistor. Pin 6 of the NAND gate is taken to level 0, with its output 4 going to level 1, when the input 2 of the logic gate is also at level 1.

Upon opening the vehicle door, point "A" is grounded. Input 12 of the NAND door goes to level 0, taking its output (pin I1) to level 1. Since pin Ii of the logic gate is in level 1, then level 1 is present at the T1 and T3 gate. The lights connected at the E, S5 and S2 points are immediately turned on (out-lamps and reading lamps, respectively).

When output 11 of the door is in logic level 1, the input of the NAND logic gate is also in level 1, and since input 2 of the NAND gate was already in level 1, the output of such a door, pin 3, goes to level 0 blocking its output in level 1.

With output 3 of the NAND gate in level 0, the timing circuit is activated, the 20 second time is only counted with the closing of the vehicle door, forcing capacitor C2 to become charged through R5 up to level of approximately 5.2 V for 20 seconds, when the saturation of the T4 transistor is started.

When the charge of C2 increases, the potential at the collector of the T4 transistor is diminished, forcing T5 transistor to saturate, and taking input I3 of the logic gate to level 1 and since the input 12 is in level 1, because the vehicle door is closed, output I1 of the door is "unlocked" (i.e. goes to level 0), so that level 0 is located at the T1 and T3 gate, disconnecting the lights at the E and S5 outputs.

The Resistor R16 adjusts the saturation point of T4, and controls the 20 second time (charging of the C2 capacitor).

Figure 12:
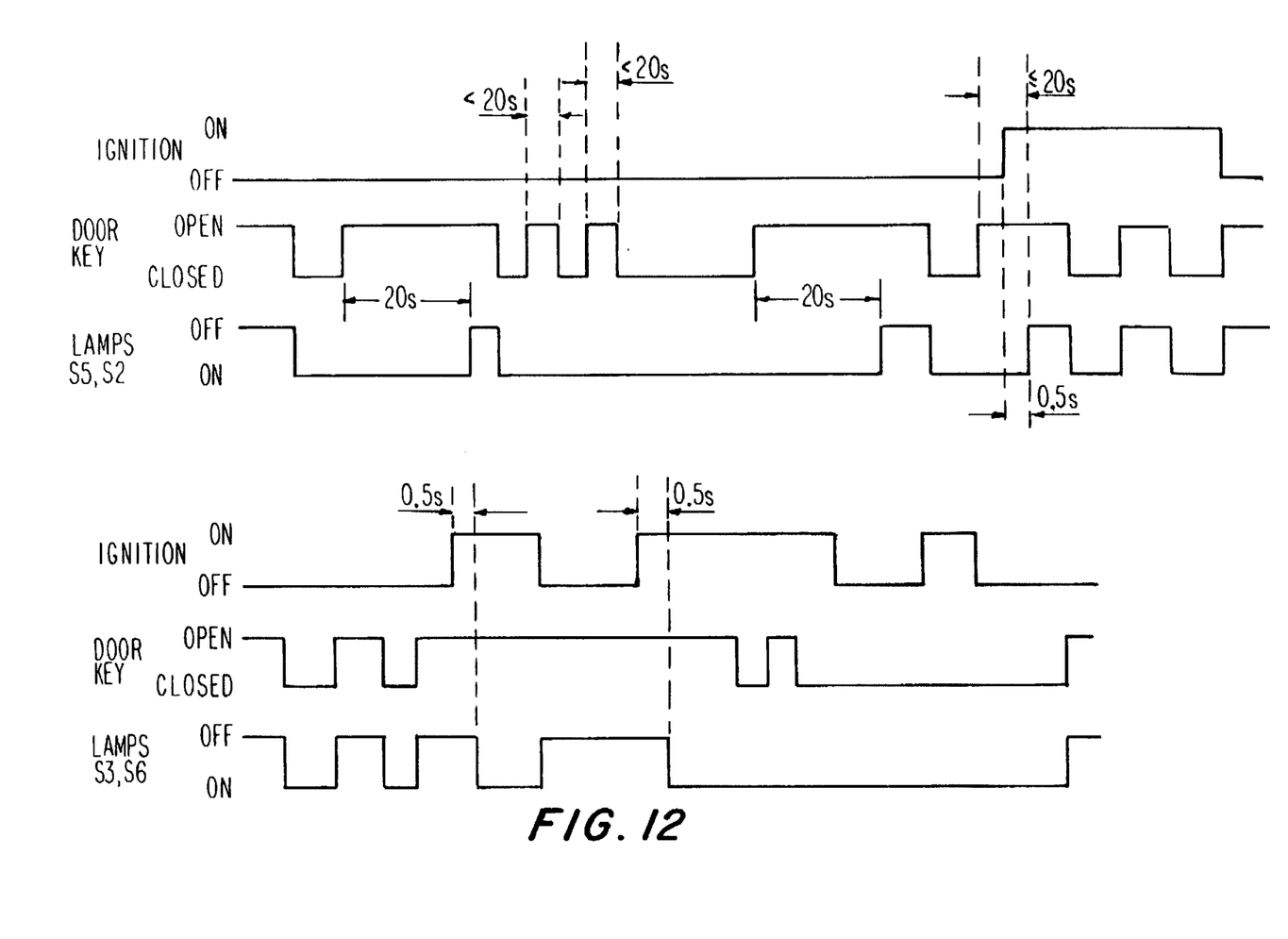
FIG. 12 is a pulse timing chart showing the pulse timing sequence in the electronic control module during operation.

If the door of the vehicle is opened, closed and open again, after an interval of less than 20 seconds, the C4 capacitor is discharged through D1 and R3 and will only start to recharge and to count the time after the last closing of the door(see upper portion of FIG. 12).

If, during the counting of the 20 second time, the ignition is turned on, the C4 capacitor is recharged through resistor R14 and, after 0.5 second, will reach the logic level 1 at the input 6 of the NAND gate, which will take its output 4 to level 0 and the input 2 of the NAND gate to level 0.

The output 3 of the NAND gate, in level 1, will cutoff T4 and T5, take input I3 of the NAND gate to level 1 and its output I1 is "unlocked" (i.e. set to level 0), throwing 0 at the T1 and T3 gate and turning off the reading and out lamps (after 0.5 seconds).

The antiglare device 2 has a spring 25 formed by a steel filament conveniently and substantially shaped as a "T", which remains under tension between the movable plate 20 and the operating lever 26, including larger, symmetrical and opposite arms 80 (FIG. 13) which remain fixed between tab elements 81 of the front face of the movable plate 20. Intermediate straight portions 82 of the spring 25 connect perpendicular end portions 83, which are bent outwards and which engage in respective grooves 84 provided in the upper end of the operating lever 26. The motion path of the operating lever 26 is limited by the front and back housing edges of the lower window 29 of the housing 3.

Figure 15:
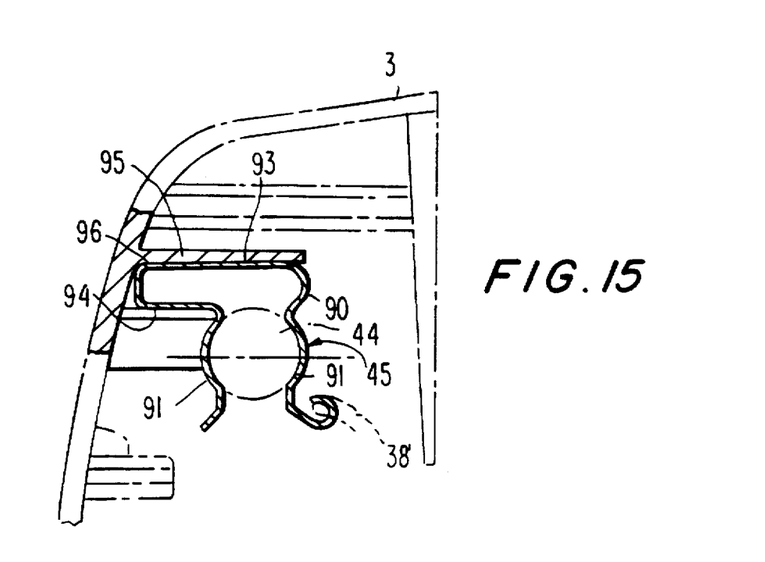
FIG. 15 is a detailed cross-sectional view of the lamp support of FIG. 14 mounted in the housing of the rearview mirror of FIG. 1.

Each light source device 40, 41 of courtesy light system 4 has a support socket 45 for the cartridge-type lamp 44 or 44' (FIGS. 14 and 15) formed by an electrical conducting material strip 90 substantially shaped as a "U" and having two essentially parallel portions 91, between which the lamp 44 or 44' is placed and fixed under pressure. The end of one of the parallel portions 91 has an eyelet 92 to which an interior conductor element 38' is connected. The support socket 45 also has a transverse portion 93 and an extension which includes a seating strap portion 94 both of which connect the two parallel portions 91. The seating strap portion extends from the parallel portion 91 opposite to the one which is connected to one of the interior conductor elements 38'. The seating strip portion 94 is held between the supporting shoulders 95 (FIG. 15) extending from the interior face of the back wall 33 of the housing 3. The seating strap portion 94 has a fixing claw 96, which is pressed against the one supporting shoulder 95 of the housing 3, so as to hold the support socket 45 fixed between the supporting shoulders 95.

The reflector 46, of each courtesy light source device 40, 41 is formed by an element 100 having a substantially "U" shaped 100 (see FIGS. 16 and 17), with an enlarged, essentially trapezoidal end portion 101 with fixing holes 102 each having a peripheral rim and which engage in a press fit on respective fixing prongs 103, which extend from the inner face of the back wall 33 of the housing 3. The central region 104 of the "U" shaped plate 100 passes behind the lamp 44 or 44' and has a polished face facing the lamp. The opposite end of the "U" shaped plate 100 is staggered and remains free.

The right side lens 47 and the left side lens 47' of the courtesy light system 4 have a trapezoidal shape and are provided with fixing catch members 110 engagable in the lower openings 48 of the housing 3. The right side 47 and left side 47' lens have prismatic shapes which are sufficient to direct the light to regions on the front passenger seat and to the right hand side of the driver's seat, respectively, and to distribute, in an adequate manner, the luminosity in such lighted up areas.

In this way, the right side lens 47 (FIGS. 18 and 19) has its prismatic region formed on the inner face (FIG. 18) of the lens provided with longitudinal ribs having a triangular cross section. These longitudinal ribs have their respective lateral faces planes 111 (FIG. 19), turned towards the front side, perpendicular to the plane of the lens, and frontal faces 112 extending at an angle relative to the lens 47. The frontal angled faces 112 located in the front area of the lens have a flat transverse shape. The front angled faces 112 located in the central and rear regions of the lens have different curvatures, with long and short radii, respectively. The outer face (FIG. 19) of the right side lens 47 has transverse strips 113, each one of them with a slightly convex profile.

Figures 16, 17, 18, 19, 20:
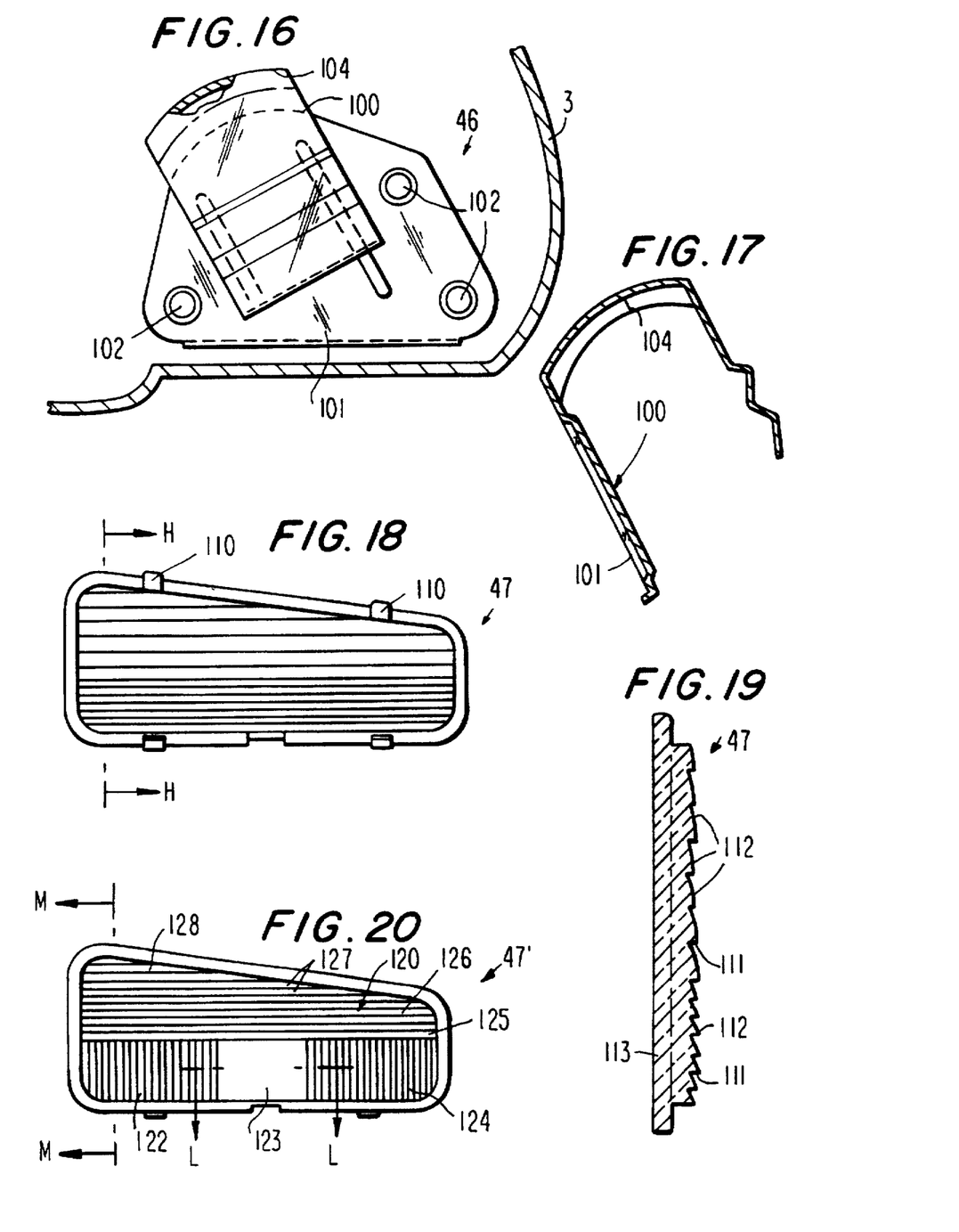
FIG. 16 is side view of a light reflector of the courtesy light system of the rearview mirror of FIG. 1.
FIG. 17 is a cross-sectional view of the light reflector of FIG. 16.
FIG. 18 is a plan view of a right side lens of the courtesy light system.
FIG. 19 is a cross-sectional view through the right side lens of FIG. 18 taken along the section line H—H in FIG. 23.
FIG. 20 is an exterior plan view of a left side lens of the courtesy light system.
Figures 21, 22:
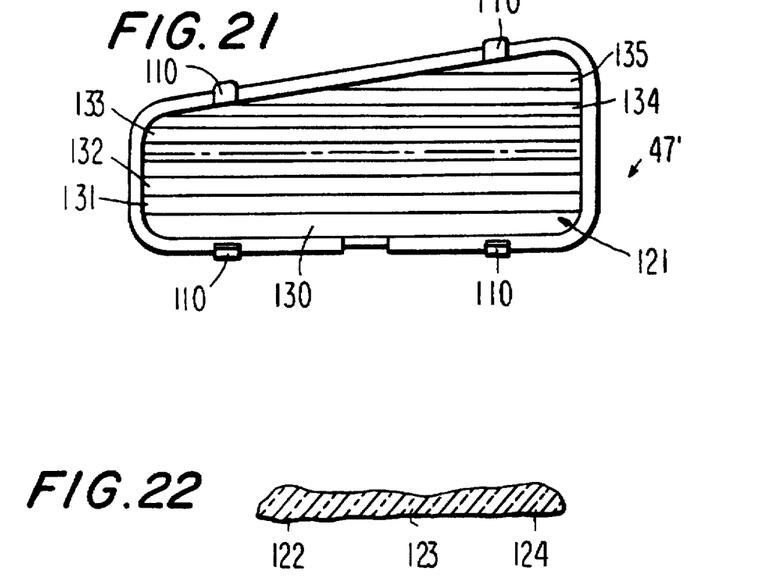
FIG. 21 is an interior plan view of the left side lens shown in FIG. 20.
FIG. 22 is a cross-sectional view through the left side lens of FIG. 20 taken along the section line L—L.
Figure 23:
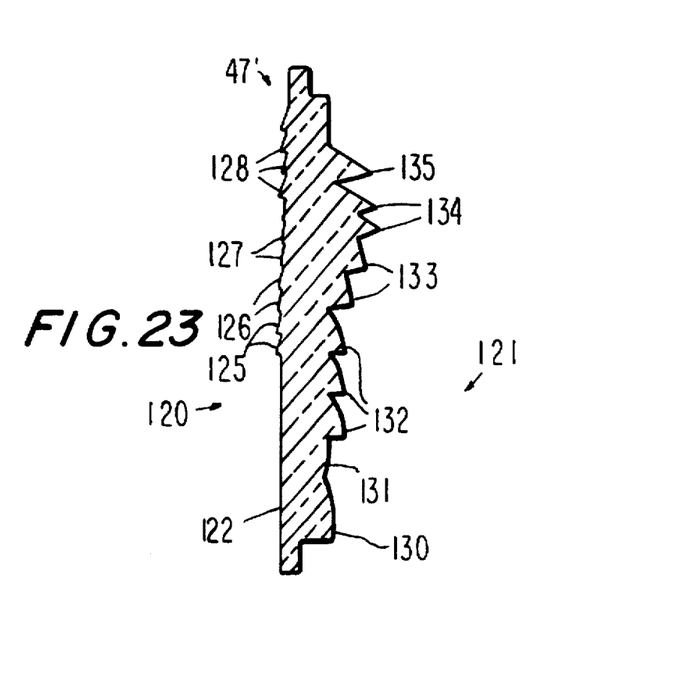
FIG. 23 is a cross-sectional view through the left side lens of FIG. 20 taken along the section line M—M.
Figure 24:
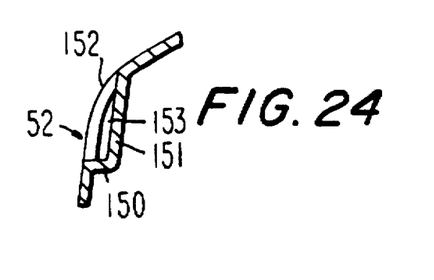
FIG. 24 is a detailed cross-sectional view taken along section line N—N in FIG. 4 showing a hot air exhaust opening of the right and left side ventilation system for the light sources of the map reading lighting system.
Figure 25:
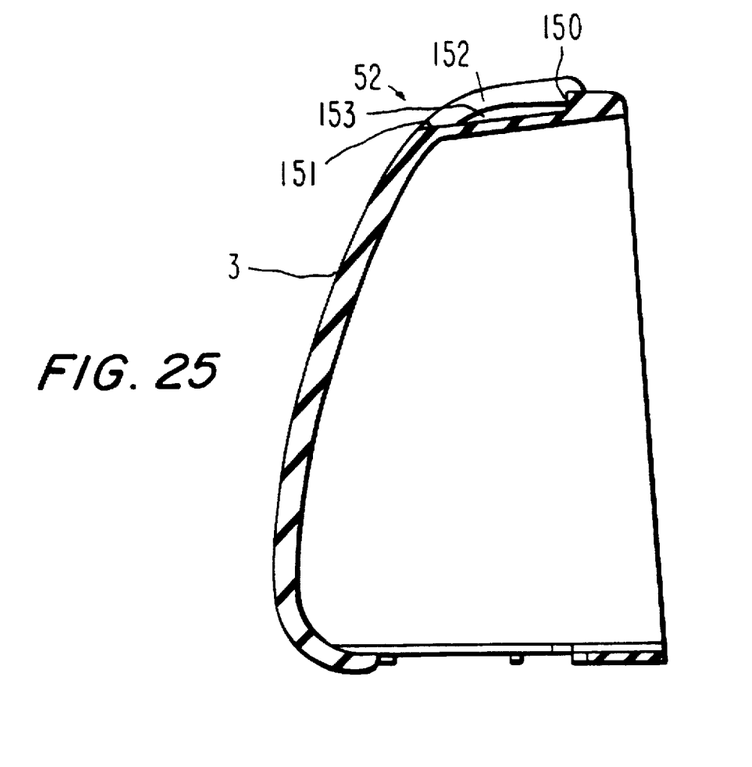
FIG. 25 is a detailed cross-sectional view taken along section line Y—Y in FIG. 2 showing a hot air exhaust opening for a light source of the map reading lighting system.

The left side lens 47' (see FIGS. 20, 21, 22 and 23) has its prismatic region formed by the outer face 120 (FIG. 20) and the inner face 121 (FIG. 21) with differentiated relief. The outer face 120 has its front region divided into three different areas with different profiles: the right side area with transverse facets 122, the substantially smooth central area 123, and the left side area 124 with transverse facets, while the back region of the outer face 120 has first, second, third and remaining outer faces longitudinal ribs 125 to 128. The transverse facets of the front right area 122 and front left area 124 areas have their profiles slightly convex (FIG. 20 L—L). The outer face longitudinal ribs 125 to 128 of the back region of the outer face 120 of the left lens 47' have their cross section substantially triangular in shape (FIG. 23), defined by flat faces, perpendicular to the lens, facing the front region of the lens, and from which angled front faces extend, converging to the plane of the lens. The two first ribs 125, adjacent to the front area of the left lens 47'; the three second ribs 126 and the two third ribs 127 immediately next to them have convex profiles on their front face with, respectively, short, medium and long radii of curvature. The other longitudinal ribs 128 have plane angled front faces.

The inner face 121 (FIG. 21) of the left lens 47' has inner face longitudinal ribs provided with cross sections differentiated with respect to each other. Therefore, the first inner face longitudinal rib 130, close to the front side of the lens, and the immediately adjacent second inner face longitudinal rib 131, have their profiles slightly convex (FIG. 23), the former being located in a more salient way than the latter. The three following third inner face longitudinal ribs 132 have triangular cross sections defined by plane faces, perpendicular to the plane of the lens and curved angled faces converging to the plane of the lens. The two following fourth inner face longitudinal ribs 133 have triangular cross sections, their front faces are plane and are at successively higher levels. The three next fifth inner face longitudinal ribs 134 and 135 have triangular cross sections and both faces are oriented at a substantial acute angle relative to the plane of the lens, with the two first fifth ribs 134 being in substantially higher levels than the fourth ribs 133 described before and than the rib 135 having a larger base than the ribs 134 and being slightly lower than those.

The right side recess 42 and left side recess 43 of the housing 3 (FIG. 2) which receive the right light source device 40 and left light source device 41 of the courtesy light system 4 are formed by walls 140 and 141 which extend, perpendicularly from the inner face of the back wall 33 of the housing 3. The walls 140 and 141 are substantially trapezoidal and rectangular, respectively. Within the space formed by the walls 140 and 141 there are central walls, shorter than walls 140 and 141, namely U-shaped walls 142 and 143, provided to support the reflectors 46; the prongs 103 for mounting the reflectors 46 and the supporting shoulders 95 for the lamp sockets 45. The air intake openings 51 of the ventilation device, which are elliptical, are located in the back wall 33 of the housing 3, and bounded by the U-shaped walls 142 and 143.

The right and left recesses 42 and 43, respectively, have hot air upper outlets 145 which open into the respective chambers 146, in which the parallel slots 52 for the outlet of hot air are located.

Each hot air outlet 52 (FIGS. 1, 2, 4; 24, 25) is designed to avoid the leaking of light, and is formed by an "L" shaped member located in a slot in back wall 33. The "L" shaped member comprises a shorter portion 150 which extends itself from wall 33 at a point close to one of the ends of the slot and a longer portion 151 perpendicular to the shorter portion 150 which extends to the other end of the slot 52, therefore bounding together with the other portions of the housing 152 located between the slots, lateral triangular openings 153 orthogonal to the plane of the slots 52, and which let the hot air out, but which do not let the light out.

While the invention has been illustrated and embodied in an internal rearview mirror with courtesy lights, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. An internal rearview mirror with courtesy lights for a motor vehicle having a vehicle cabin with a front windshield, a plurality of doors provided with a plurality of courtesy lamps, a ceiling lamp on a ceiling of the cabin and a trunk with a trunk light; said rearview mirror comprising a housing (3); a mirror device (1) mounted in the housing (3); an antiglare device (2) connected to the mirror device (1) and mounted in the housing (3); a courtesy light system (4) including switches (49, 49') in the housing (3); an electronic control module (5) in the housing comprising a printed circuit board (70) having electrical conductor paths (75) connected to the courtesy light system (4) and including a timing device (6) connected to and controlling the ceiling lamp (200), the trunk lamp (202) and the door courtesy lamps (201) in the vicinity of the doors; and a detachable support (7) comprising a spring releasable neck (8) and a base (9) connected to the neck (8), said detachable support (7) being pivotally connected to said housing (3) and said base (9) of said detachable support (7) being attached centrally in the vehicle cabin, wherein the printed circuit board (70) of the electronic control module (5) is provided with throughgoing holes (72) and the housing (3) has interior fixing columns (71) aligned with said holes (72) so that said printed circuit board (70) can be secured to said housing (3) by fixing screws (72') engaged in said fixing columns (71) and passing through said holes (72); and the electronic control module (5) has electrical connector means (173) comprising a prismatic shaped support block (76) mounted on a lateral extension (74) of the printed circuit board (70) and a set of connector pins (73) perpendicular to and arrayed directly on said lateral extension (74) and passing through said support block (76), said connector pins (73) are electrically connected to said electrical conductor paths (75), both said support block (76) and said lateral extension (74) are aligned with an off centrally positioned opening (37) of the housing (3), said housing (3) is provided with claw means (77) engaging in a groove (77') in the lateral extension (74) so as to assist in holding said printed circuit board (70); and a plurality of interior conductor elements (38') originating from said printed circuit board (70) are provided for electrical connection to said switches (49,49') of said courtesy light system (4).

2. The internal rearview mirror as defined in claim 1, wherein each of said connector pins (73) has a connecting end (73'), an opposite end (73''') remote from said connecting end (73') and an intermediate portion (73''), said intermediate portion (73'') extending between and being comparatively larger than said connecting end (73') and said opposite end (73'''), and wherein said connecting end (73') is held in an electrically conducting sleeve mounted in the printed circuit board (70) and is welded and connected to one of said electrical conductor paths (75); and said intermediate larger portion (73'') is held within a throughgoing hole (76') of said support block (76) and has a claw element (78) in said throughgoing hole, extending from said intermediate larger portion to a catch member (78') of said support block (76) so as to remain fixed against said catch member (78'); and said opposite end (73''') of said connector pin (73) protrudes from said support block (76); and a lower face of said support block (76) is provided with at least one guiding and indexing projection (79) connecting to said printed circuit board (70), and a retaining loop member (79') for connection to an outside conductor element (38) is provided projecting from an upper face of said support block (76) and beyond the connector pins (73).

3. The internal rearview mirror as defined in 1, wherein the courtesy light system (4) includes a right light source device (40) and a left light source device (41) and said electronic module (5) includes right output circuit means (210) for controlling said right light source device (40), left output circuit means (211) for controlling said left light source device (41), power supply circuit means (212) for supplying electrical power to the ceiling lamp (200), the trunk lamp (202) and the door courtesy lamps (201) as well as the light source devices (40, 41), supply/protection means (213), timer circuit means (6) for timing and turning on and off of the ceiling lamp (200), the trunk lamp (202) and the door courtesy lamps (201), and control circuit means (214) for controlling said timer circuit means (6).

4. The internal rearview mirror as defined in 3, wherein the right light source device (40) includes a cartridge type lamp (44) and said switch (49) as well as a plurality of output terminals (S4, S5, and S6) and said left light source device (41) includes a cartridge type lamp (44') and said switch (49') as well as a plurality of output terminals (S1, S2, and S3).

5. The internal rearview mirror as defined in claim 3, wherein said power supply circuit means (212) includes three field effect power transistors (T1, T2 and T3) and said power supply circuit means (212) electrically connects said control circuit means (214) to said right and left output circuit means (210, 211) and to the ceiling lamp (200), the trunk lamp (202) and the door courtesy lamps (201).

6. The internal rearview mirror as defined in claim 3, wherein said supply/protection circuit means (213) comprises a resistor (R4), means for stabilizing a supply of said electrical power at 10 V including a Zener diode (Z1) and means for filtering said electrical power including a capacitor (C3).

7. The internal rearview mirror as defined in claim 3, wherein said control circuit means (214) includes ignition input (CN1 D), two resistors (R13 and R14), a capacitor (C4), a diode (D3) and integrated circuit means (I1) including means for generating and sending control signals for switching the timer circuit means on and off when an input signal is received in the integrated circuit means (I1) via said ignition input (CN1 D).

8. The internal rearview mirror as defined in claim 3, wherein said timer circuit means (6) comprises means for turning on said door courtesy lights when one of the doors is opened with a door key, said means for turning on said door courtesy lights (201) comprising a door key input (230), a plurality of resistors (R1 to R3; R5 to R12), a variable resistor (R16) for adjusting timing, a plurality of capacitors (C1 and C2), a diode (D1) and a plurality of transistors (T4 and T5).

9. The internal rearview mirror as claimed in 1, wherein the antiglare device (2) comprises an operating lever (26) mounted in said housing (3), a movable plate (20) engaged with the mirror device (1) and a spring (25) consisting of a substantially "T" shaped steel filament, said spring (25) being placed between said movable plate (20) and said operating lever (26) under tension, and said spring includes upper, symmetrical arms (80) fixed between tab elements (81) extending from a front face of said movable plate (20), end portions (83) of said spring engaged in respective grooves (84) in said operating lever and intermediate portions (82) of said spring connecting the end portions (83) and the upper symmetrical arms (80), a motion path of said operating lever (26) being bounded by front and back housing edges of a lower window (29) of the housing (3).

10. The internal rearview mirror as defined in claim 1, wherein the courtesy light system (4) includes a right side light source device (40) and a left side light source device (41) and each of said light source devices has two support sockets (45) configured for a cartridge type lamp (44, 44'), and each of said support sockets (45) is formed by a substantially "U" shaped strip of electrically conducting material (90) and has two substantially parallel portions (91), said cartridge-type lamp (44, 44') being secured between said substantially parallel portions (91) by pressure; an eyelet (92) formed at an end of one of the substantially parallel portions (91) for connection to one of the interior conductor element (38'); and a transverse portion (93) connecting the two substantially parallel portions (91) and having an extension forming a seating strap portion (94) protruding beyond said parallel portion (91) opposite to said one of said substantially parallel portions having said eyelet (92), said seating strap portion (94) being held between a plurality of supporting shoulders (95) extending from an inner face of a back wall (33) of said housing (3) and said transverse portion (93) having a fixing claw (96) pressing against one of said supporting shoulders (95) of the housing (3) so as to hold said socket (45) fixed therein.

11. The internal rearview mirror as defined in claim 1, wherein the courtesy light system (4) includes a right side light source device (40) and a left side light source device (41), and said light source devices each has a cartridge-type lamp (44, 44') and a reflector, said reflector (46) comprises a U-shaped plate (100) with an expanded and substantially trapezoidal end portion (101) provided with a plurality of fixing holes (102) with each hole having a peripheral upwardly extending rim and another end portion opposite to said substantially trapezoidal end portion (101), said another end portion being staggered and free; and wherein an inner face of a back wall (33) of said housing (3) has a plurality of fixing prongs (103) extending therefrom, said fixing prongs (103) being engaged in said fixing holes (102) of said reflector (46) and said U-shaped plate (100) has an intermediate region (104) behind said cartridge-type lamp (44, 44') with a polished face facing said cartridge-type lamp (44, 44').

12. The internal rearview mirror as defined in claim 1, wherein said courtesy light system (4) includes a right side lens (47) and a left side lens (47') each having a trapezoidal shape and provided with fixing catch members (110) engaging in lower openings (48) of the housing (3); said right side lens (47) having a plurality of prismatic profiles sufficient to direct light towards and illuminate a region of a passenger seat of said motor vehicle and said left side lens having a plurality of prismatic profiles sufficient to direct light towards and illuminate another region including a right side area of a driver's seat of said motor vehicle, and wherein said right side lens (47) has a prismatic profile formed on an inner face thereof and having longitudinal ribs, each of said ribs having a triangular cross section, said longitudinal ribs having a plurality of plane lateral faces (111) turned frontwards perpendicular to a plane of the right side lens and a plurality of front faces (112) extending from said plane lateral faces (111) and oriented at an angle relative to said plane of said right side lens (47); each of said front faces (112) located in a front region of said right side lens has a plane cross-sectional profile, and said front faces (112) located in a central and a rear region of said right side lens (47) have a plurality of curved cross-sectional profiles with comparatively shorter and comparatively longer radii of curvature; and an outer face of said right side lens (47) has a plurality of convex profiled transverse strips (113).

13. The internal rearview mirror as defined in claim 1, wherein said courtesy light system (4) includes a right side lens (47) and a left side lens (47') each having a trapezoidal shape, and an outer face (120) of said left side lens (47') has a prismatic profile, front region and a back region, and said front region of the outer face (120) is divided into a right side area (122) with a plurality of transverse facets, a substantially smooth central area (123) and a left side area (124) with a plurality of transverse facets, and said back region of the outer face (120) is provided with two first outer face longitudinal ribs (125), three second outer face longitudinal ribs (126), two third outer face longitudinal ribs (127) and a plurality of remaining outer face longitudinal ribs (128); each of said transverse facets of said right side area (122) and said left side area (124) has a slightly convex profile and each of the outer face longitudinal ribs (125 to 128) of the back region having a substantially triangular cross section, said triangular cross section being defined by a plane face perpendicular to a plane of the left side lens (47') and facing a front side of said left side lens and a front face extending at an angle to said plane face and converging to said plane of the left side lens (47'); the first outer face longitudinal ribs (125) are immediately adjacent to said front region of the left side lens (47'), the second outer face longitudinal ribs (126) are between said first and third outer face longitudinal ribs and the third outer face longitudinal ribs (127) have a plurality of front faces with a plurality of convex profiles having a plurality of comparatively short, medium and long curvature radii, respectively; each of the remaining outer face longitudinal ribs (128) having a plane front face oriented at an angle to said plane of said left side lens (47'); and an inner face (121) of said left side lens (47') has a plurality of inner face longitudinal ribs provided with a plurality of cross sections differing from each other, each of said inner face longitudinal ribs including a first inner face longitudinal rib (130) next to said front region of said lens and a second inner face longitudinal rib (131) adjacent to said first inner face longitudinal rib (130) has slightly convex profile, the first inner face longitudinal rib (130) having a convex profile more prominent than that of said second inner face longitudinal rib (131) adjacent thereto, and three third inner face longitudinal ribs (132) adjacent said second inner face longitudinal ribs (131) each of said third inner face longitudinal ribs having a triangular cross section with a plane face perpendicular to the plane of the lens and a curved face extending at an angle to said plane face and converging to said plane of said left side lens (47'); and two fourth inner face longitudinal ribs (133) next to said three third inner face longitudinal ribs (132) provided with a plurality of triangular cross sections having a plurality of plane front faces at successively in higher levels from each other; and three fifth inner face longitudinal ribs (134 and 135) adjacent to said two fourth inner face longitudinal ribs having a plurality of triangular cross sections each of said triangular cross sections of said fifth inner face longitudinal ribs having a plurality of faces oriented at a substantial acute angle relative said plane of said left side lens (47'), with two (134) of the fifth inner face longitudinal ribs being at a substantially higher level than the fourth inner face longitudinal ribs (133) and with a remaining one (135) of the fifth inner face longitudinal ribs having a larger base and being slightly lower than the two (134) of the fifth inner face longitudinal ribs.

14. The internal rearview mirror as defined in claim 1, wherein the courtesy light system (4) includes a right side light source device (40) and a left side light source device (41), each of said light source devices (40, 41) includes a cartridge-type lamp (44, 44'), a reflector (46) and a support socket; and said housing (3) has a right side recess (42) and a left side recess (43) formed for receiving and holding the right side light source device (40) and the left side light source device (41), respectively, and said right side recess and said left side recess are formed by a plurality of recess walls (140 and 141), respectively, said recess walls extending perpendicularly from an interior face of a back wall (33) of said housing (3), and said right side recess (42) and said left side recess (43) are substantially trapezoidal and rectangular shaped, respectively; and within respective spaces bounded by said recess walls, a plurality of substantially U-shaped central walls (142 and 143) for supporting lower than the recess walls of said reflectors (46), a plurality of fixing prongs (103) fixing of said reflectors (46) and a plurality of supporting shoulders (95) for holding said support sockets (45); and wherein each of said U-shaped central walls (142, 143) bounds a region of said back wall (33) and an elliptical opening (51) for admission of cooling air (51) is provided in each of said regions in said back wall (33).

15. The internal rearview mirror as defined in claim 14, wherein said recess walls (140) of the right side recess (42) and said recess walls (141) of the left side recess (43) are both provided with upper hot air exhaust openings (145) opening into a plurality of respective chambers (146) of said housing (3) and said housing is provided with a plurality of parallel slots (52) allowing hot air outflow from said chambers (146).

16. The internal rearview mirror as defined in claim 15, wherein each of said parallel slots (52) is provided with a light leakage avoidance device shaped like an "L" and comprising a shorter portion (150) extending perpendicularly from the back wall at a point close to one end of said slot (52) and a longer portion (151) connected to the shorter portion (150) and extending perpendicularly from said shorter portion (150) to the vicinity of another end of said slot so as to form a lateral triangular opening (153) opening in a direction orthogonal to said slot (52) for reduction of light leakage from said slot (52) while allowing passage of hot air through said slot (52).

\* \* \* \* \*